United States Patent
Barton et al.

(10) Patent No.: US 8,494,717 B2
(45) Date of Patent: Jul. 23, 2013

(54) STEERING CONTROL DURING SPLIT MU BRAKING

(75) Inventors: Andrew Dennis Barton, Coventry (GB); Anthony Walter Burton, Birmingham (GB); Adam John Heenan, Sheffield (GB)

(73) Assignee: TRW Limited, Solihull, West Midlands (GB)

( * ) Notice: Subject to any disclaimer, the term of this patent is extended or adjusted under 35 U.S.C. 154(b) by 443 days.

(21) Appl. No.: 12/446,537

(22) PCT Filed: Oct. 13, 2007

(86) PCT No.: PCT/GB2007/004025
§ 371 (c)(1),
(2), (4) Date: Dec. 9, 2010

(87) PCT Pub. No.: WO2008/047152
PCT Pub. Date: Apr. 24, 2008

(65) Prior Publication Data
US 2011/0077824 A1 Mar. 31, 2011

(30) Foreign Application Priority Data
Oct. 21, 2006 (GB) .................................. 0620962.1

(51) Int. Cl.
*A01B 69/00* (2006.01)
(52) U.S. Cl.
USPC ............................................ 701/42; 180/197
(58) Field of Classification Search
USPC ............... 701/42, 70; 180/197, 9.34; 303/146
See application file for complete search history.

(56) References Cited

U.S. PATENT DOCUMENTS

| | | | |
|---|---|---|---|
| 6,968,920 B2 * | 11/2005 | Barton et al. | 180/446 |
| 2002/0143451 A1 * | 10/2002 | Hac et al. | 701/48 |
| 2005/0247510 A1 | 11/2005 | Asano | |

FOREIGN PATENT DOCUMENTS

| | | |
|---|---|---|
| EP | 1209053 A1 | 5/2002 |
| EP | 1516800 A1 | 3/2005 |
| JP | 2006256425 A | 9/2006 |

OTHER PUBLICATIONS

PCT/GB2007/004025 International Search Report dated Feb. 1, 2008.
Chinese Search Report, Application No. CN200780044069.2, dated Jul. 14, 2010.
Patent Act 1977: Search Report under Section 17, Application No. GB0620962.1, dated Dec. 11, 2006.

* cited by examiner

*Primary Examiner* — Thomas Black
*Assistant Examiner* — Luke Huynh
(74) *Attorney, Agent, or Firm* — MacMillan, Sobanski & Todd, LLC

(57) ABSTRACT

An electric assisted steering control strategy for a steering system for a vehicle is arranged to assist the driver in controlling the vehicle during a split mu braking operation. The steering is provided with assistance being based on at least one operational variable representing a corrective steer angle for the vehicle which is added to a main assistance torque via a driver feedback controller, and the strategy is adapted to employ an estimate of yaw moment of the vehicle as the operational variable, the yaw moment being determined by processing the speed of wheels on opposite sides of the vehicle.

14 Claims, 5 Drawing Sheets

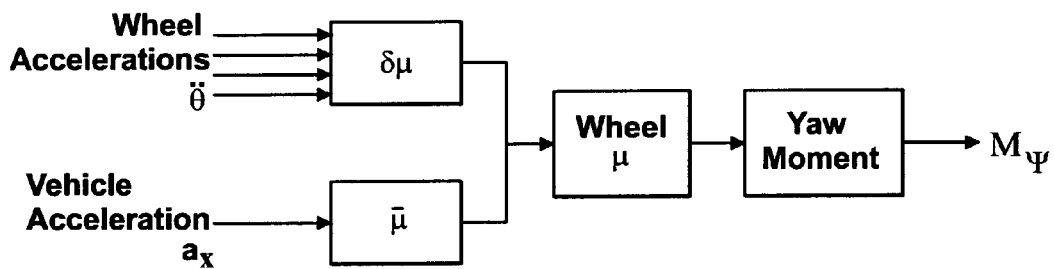
Fig. 2
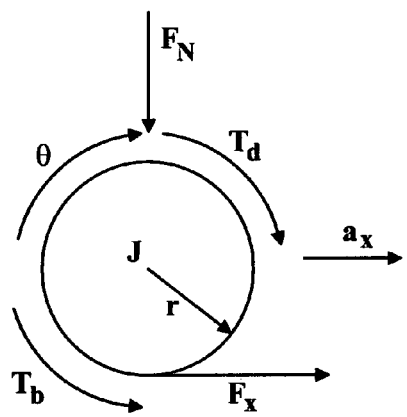
Fig. 7
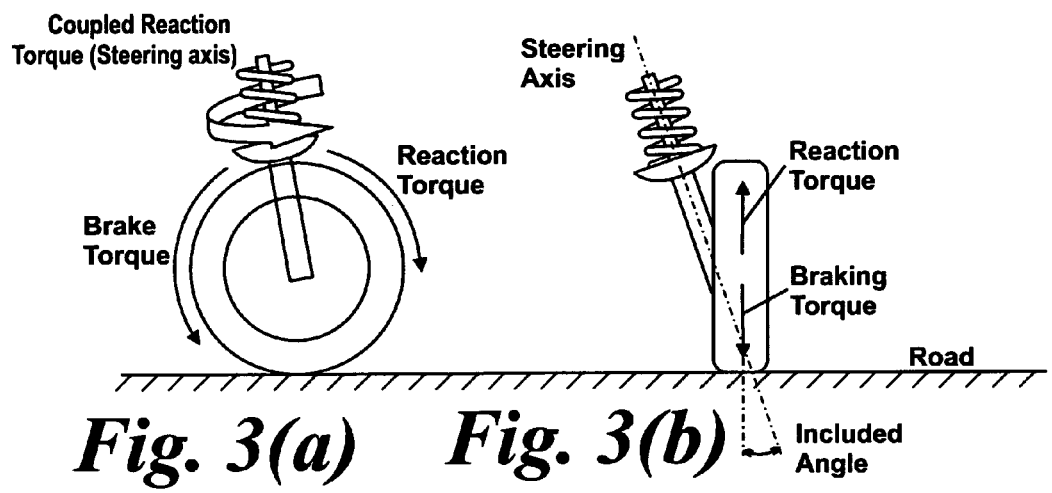
Fig. 3(a)   Fig. 3(b)

STEERING CONTROL DURING SPLIT MU BRAKING

CROSS-REFERENCE TO RELATED APPLICATIONS

This application is a National Stage of International Application No. PCT/GB2007/004025 filed Oct. 13, 2007, the disclosures of which are incorporated herein by reference in their entirety, and which claimed priority to Great Britain Patent Application No. 0620962.1 filed Oct. 21, 2006, the disclosures of which are incorporated herein by reference in their entirety.

BACKGROUND OF THE INVENTION

This invention relates to improvements in steering control for a vehicle having an electrically power assisted steering system (EPAS) when running in the situation of a so called split-mu braking operation.

Electric steering systems are well known in the art. Typically, a steering wheel is connected to one or more road wheels through a rack and pinion gearbox. A torque sensor measures the torque applied to the steering wheel by a driver and converts this into an assistance torque signal that is used to drive an electric motor connected to a steering shaft attached to the gearbox. The motor applies a torque generally in the sense as that applied by the driver so as to assist the driver in turning the wheel.

Other known electric assist systems include electro-hydraulic systems in which the assistance is provided by hydraulic means under at least partial control of an electronic control system.

BRIEF SUMMARY OF THE INVENTION

In the event that a vehicle is braking, under some conditions the forces that are generated can result in unwanted reaction forces being applied to the steering system. At best these may be felt through the wheel which gives an uncomfortable and possibly alarming feel to the driver as the forces move the wheel. At worst, the forces can unbalance the car causing it to spin out of control.

One situation in which this can occur is known as a split-mu braking event. The braking torques in such an event will be different from wheel to wheel. This is particularly significant during the first moments of a braking event, e.g. just after the brakes have been applied. At that time, the forces at the wheels will cause forces in the steering system tending to pull the car to one side. After a short time, the car will pull back the other way until the forces in the steering balance out as the wheels find their natural centre point. The initial pull can be quite violent and catch a driver unaware.

In accordance with the invention there is provided an electric assisted steering control strategy for a steering system for a vehicle which is arranged to assist the driver in controlling the vehicle during a split mu braking operation, the assistance being based on at least one operational variable representing a corrective steer angle for the vehicle which is added to a main assistance torque via a driver feedback controller, and in which the strategy is adapted to employ an estimate of yaw moment of the vehicle as the operational variable, the yaw moment being determined by processing the speed of wheels on opposite sides of the vehicle.

By deriving yaw moment from wheel speed, the strategy is not reliant on derived ABS signals or inertial sensors. Wheel speed measurements are typically available directly from the vehicles signal bus, and as such are readily and reliably accessible.

The strategy may comprise measuring or otherwise obtaining an estimate of the speed of the front left wheel and front right wheel of the vehicle, multiplying the difference by a constant to give the difference in wheel speed for the front wheels, and dividing the result by the track width of the vehicle.

The strategy may comprise multiplying the braking yaw moment by a gain to give the corrective steer angle.

The strategy may comprise obtaining the wheel speeds upon initiation of a braking operation of the vehicle. It is known for ABS systems to include a flag which is raised to indicate split mu braking, and this may be used to prompt the strategy to obtain the wheel speeds.

The strategy may disregard any wheel speed measurement obtained after initial operation of an ABS system, by which we mean operation of the system to at least partially dump the pressure applied to one or both of the front wheels. After this time, the initial values obtained at the start of a stop may continue to be used.

The applicant has appreciated that the speed measurements are only reliably representative of the friction levels at the wheels at the very start of a stop.

According to a second aspect the invention provides an electric assisted steering apparatus for a vehicle comprising:

a steering mechanism which operatively connects a steering wheel to the road wheels of a vehicle, a torque sensing means which is adapted to produce an output signal indicative of the torque applied to a portion of the steering mechanism by the driver, a first signal processing means which is adapted to determine an assistance torque as a function of the output signal of the torque sensor which is to be applied to the steering mechanism to assist the driver in turning the wheel;

a second signal processing means which is adapted to determine the yaw moment of the vehicle based on at least one operational variable representing a corrective steer angle for the vehicle which is added to a main assistance torque, and in which the apparatus is adapted to employ an estimate of yaw moment of the vehicle as the operational variable, the yaw moment being determined by processing the output of a wheel speed determining means that determines the wheel speeds on opposite sides of the vehicle.

The wheel speed determining means may comprise a sensor associated with each wheel whose speed is to be determined. In many cases, such sensors will already be present as part of an anti-lock braking system. The signals from these sensors, as available across a vehicles CAN bus may therefore comprise the required wheel speed determining means.

The second signal processing means may determine a yaw value using speed measurements obtained during an initial phase of braking. It may only use values obtained after a braking event has been initiated, and prior to the activation of any ABS system. This is because after the ABS has initiated, the wheel speeds may vary considerably as each wheel may longer experience the same braking force.

The wheel speed signals may correspond to the respective speeds of each of the two wheels attached to a front of a vehicle such as a four-wheel vehicle, or the front axle of a multiple axle vehicle such as a truck cab or van.

The apparatus may include a memory in which is stored values indicative of one or more of the following:
The weight of the vehicle to which the steering is fitted;
The track of the vehicle, i.e. the spacing between the wheels,
The geometry of the steering system.

Other advantages of this invention will become apparent to those skilled in the art from the following detailed description of the preferred embodiments, when read in light of the accompanying drawings.

BRIEF DESCRIPTION OF THE DRAWINGS

FIG. 2 is block diagram overview of a control strategy for the steering assembly;

FIG. 3(a) is an illustration of the forces on a wheel during braking as viewed from the side and 3(b) is the same wheel viewed from the front;

FIG. 7 is a further simple force diagram for a wheel.

DETAILED DESCRIPTION OF THE INVENTION

Figure 1:
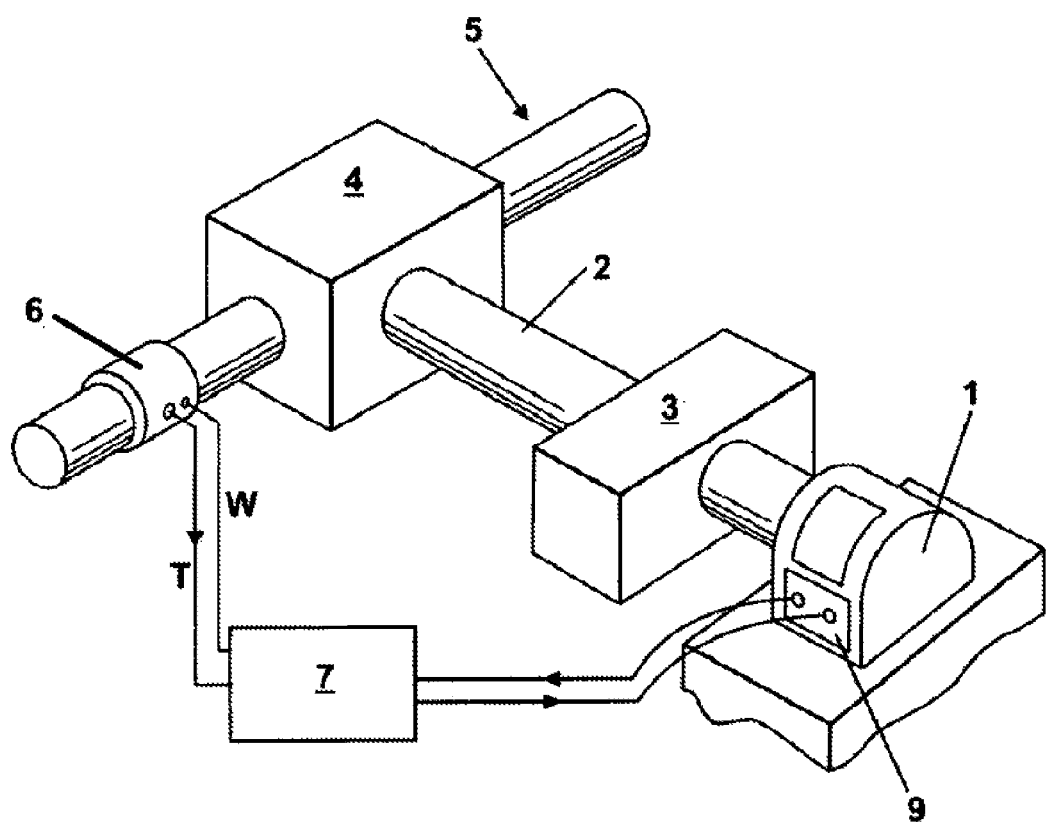
FIG. 1 is a schematic representation of a steering assembly according to the invention.

An electric power assisted steering assembly is illustrated in FIG. 1 of the accompanying drawings. The apparatus comprises an electric motor 1, which acts upon a drive shaft 2 through an (optional) gearbox 3 of the rack and pinion type. The drive shaft terminates with a worm gear 4 that co-operates with a wheel provided on a portion of a steering column 5 or a shaft operatively connected to the steering column. The apparatus is such that any force applied to the steering column through the gearbox 3 would be felt by the driver, requiring the driver to apply a constant small corrective torque to hold a straight line. As will become apparent, the invention of this embodiment works to at least partially compensate for this pull.

The steering column carries a torque sensor 6 that is adapted to measure the torque carried by the steering column. This torque is produced by the driver turning the steering wheel, either to turn a corner or to counter pull of the vehicle to one side. The output signal T from this sensor is fed to a signal processing means in the form of a digital signal processor 7.

An angular velocity sensor is also provided on the steering column. In some arrangements, this could be combined with the torque sensor 6 as a single device. This produces an output signal W indicative of the angular velocity of the steering wheel (i.e. how quick the driver turns the wheel).

A vehicle speed sensor 9 is also provided which measures the road speed of the vehicle V. This is also fed to the signal processing means 7.

The signal processing means acts on the measured signals in the manner of the strategy outlined by the schematic of FIG. 2 of the accompanying drawings. The purpose of the strategy is to provide assistance to the driver to help keep the vehicle stable during split mu braking.

A split mu braking operation occurs when pressure is applied to the vehicle at a time that the wheels on the left of the vehicle are on a surface having a different coefficient of friction to the wheels on the right. If a wheel is on a low mu surface it will tend to decelerate quicker than if it were on a high mu surface. When the wheel decelerates, it will try to continue to rotate because of inertia of the wheel. This will cause a torque which opposes the braking torque (Reaction Torque).

In many vehicles, the angle between the steering axis and the plane of wheel rotation (Included angle) is not zero. The non-zero Included angle causes the reaction torque to be coupled through the steering axis and this creates a steering torque. These forces are shown in FIG. 3 for a wheel 20 and McPherson strut type suspension 22 viewed from the side (3a) and the front (3b).

Figure 4A:
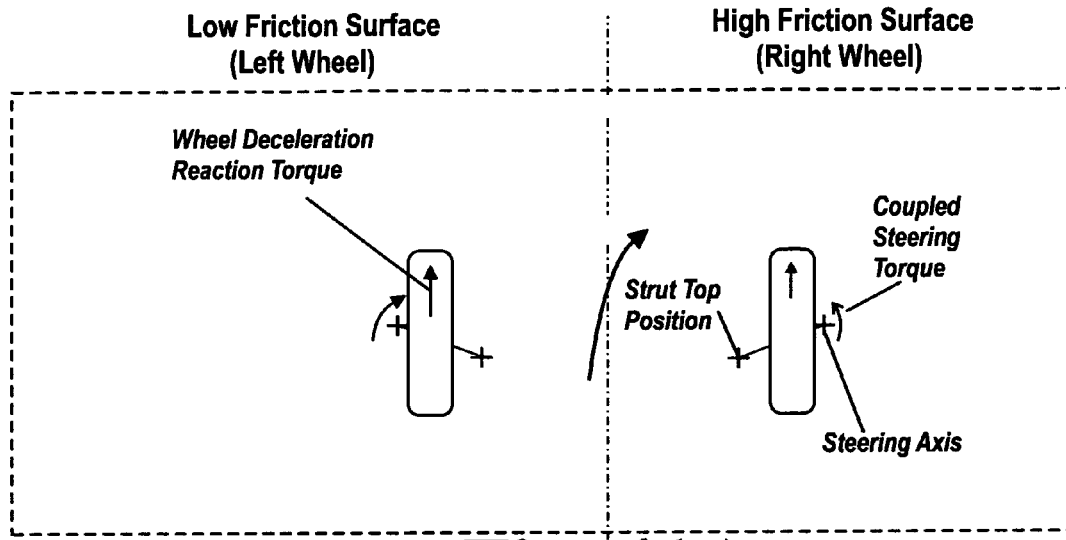
FIG. 4(a) to (c) illustrate the forces present in the steering following a split mu brake operation.
Figure 4B:
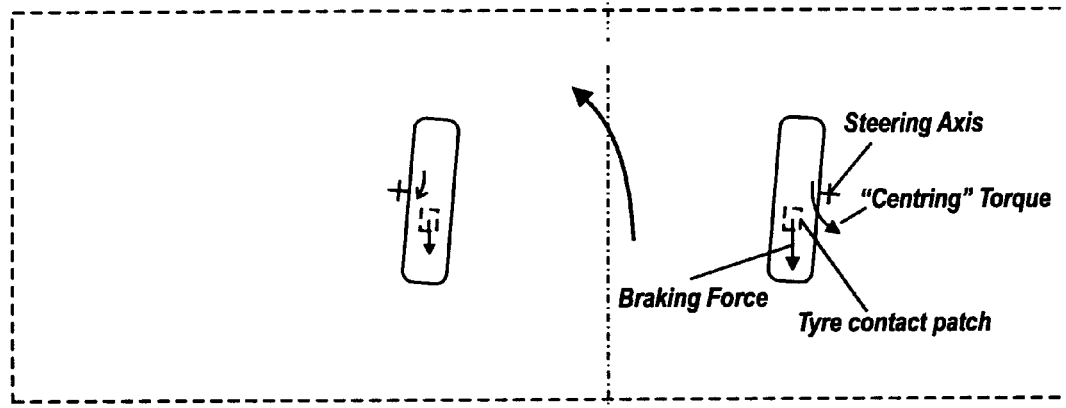
Figure 4C:
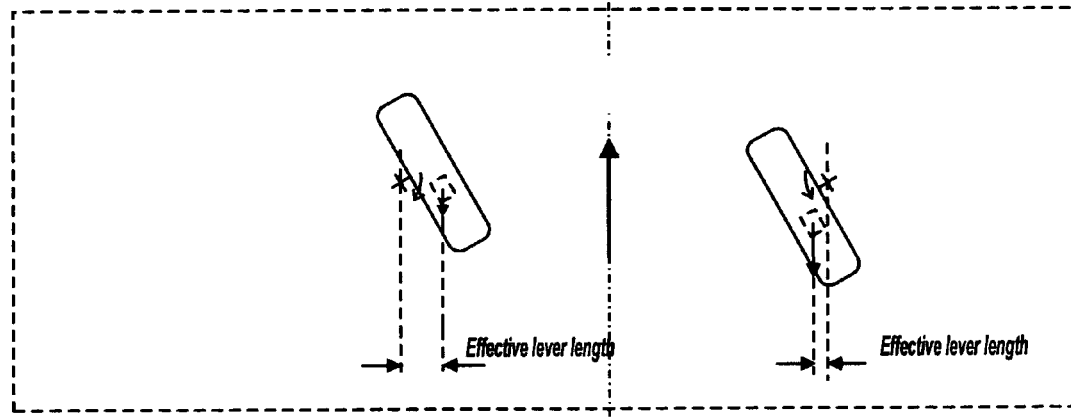

The effect of these forces during a split mu braking operation is shown in FIGS. 4a to 4c. Initially, as shown in FIG. 4a, wheel deceleration during initial braking is higher on the low mu surface than the high mu surface. This creates an imbalance in the reaction torque coupled into the steering that causes the vehicle to steer to the high mu surface. Of course, the direction of this initial steer demands largely on the steering geometry, and it could equally well steer the other way for a different geometry.

A short time after the initial brake operation there is an imbalance in the "self centering" torques caused by mismatch in brake forces between left and right wheels. The higher brake force on the high mu side causes the vehicle to steer towards the low mu surface. This is shown in FIG. 4(b) of the accompanying drawings.

After a still further period of time, assuming the vehicle is still braking, the steering settles at an angle where the Self centering torque equalises. This is shown in FIG. 4(c) of the accompanying drawings.

Figure 5:
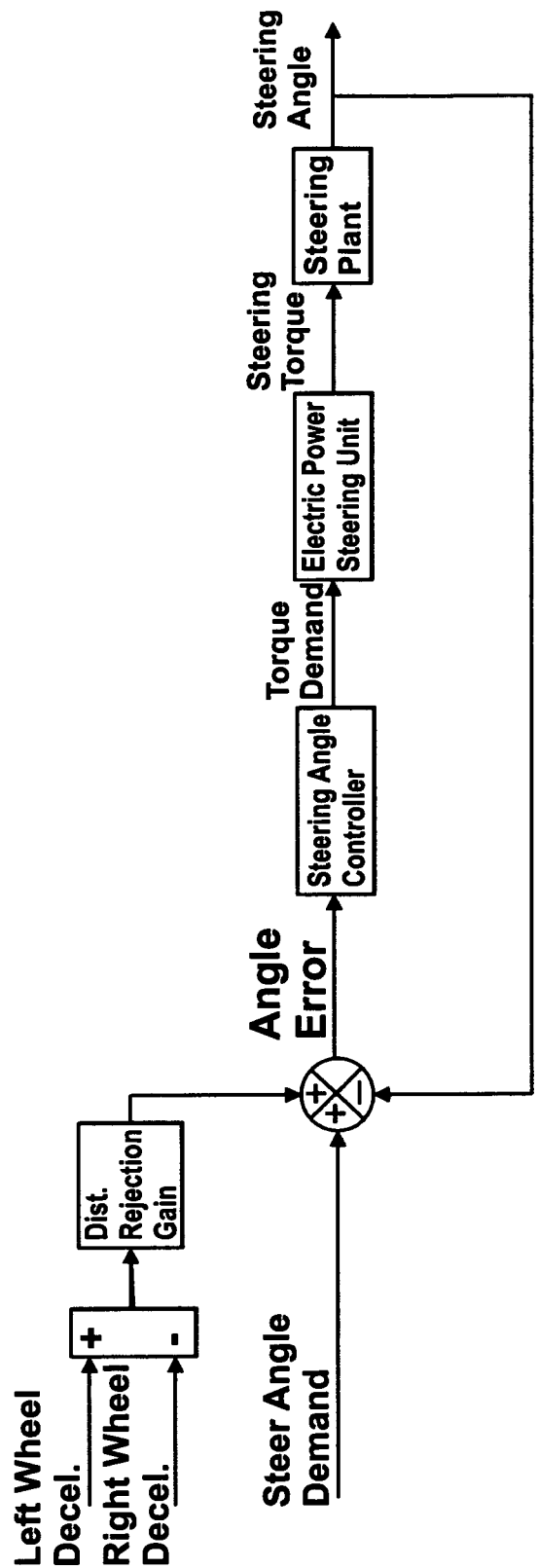
FIG. 5 is a more detailed schematic of a first arrangement for a control strategy for applying assistance to the steering to provide vehicle stability.

The control strategy shown in FIG. 5 comprises generating a steering angle that is applied to the steering to correct for this self-centering action, and so help the driver control the vehicle.

In a first step, measurements of the speed of the left front wheel and the right front wheel are made. These are differentiated to derive the deceleration of each of the wheels.

The two deceleration values are fed to a differencing block that determines the difference between the values.

In a next block, the difference value is multiplied by a gain Dist. Rejection gain and fed to one input of a comparator block. This block has three inputs. One as described receives the multiplied difference value. A second receives a steer angle demand value, and a third receives an actual measurement of steering angle. The block adds together the difference and steer angle demand and subtracts the steering angle. The block produces an output in the form of an error angle representing the difference between a desired angle and the actual angle.

The angle error value is passed to a steering angle controller that derives a torque demand signal from this. The torque demand is a control signal for an actuator such as an electric motor that applies a torque representative of the torque demand to the steering mechanism.

As can be seen, the measurement of actual steering angle is the final step, and by passing it back to the angle error-determining block a negative feedback loop is established. The system will therefore work to reduce the error angle.

Figure 6:
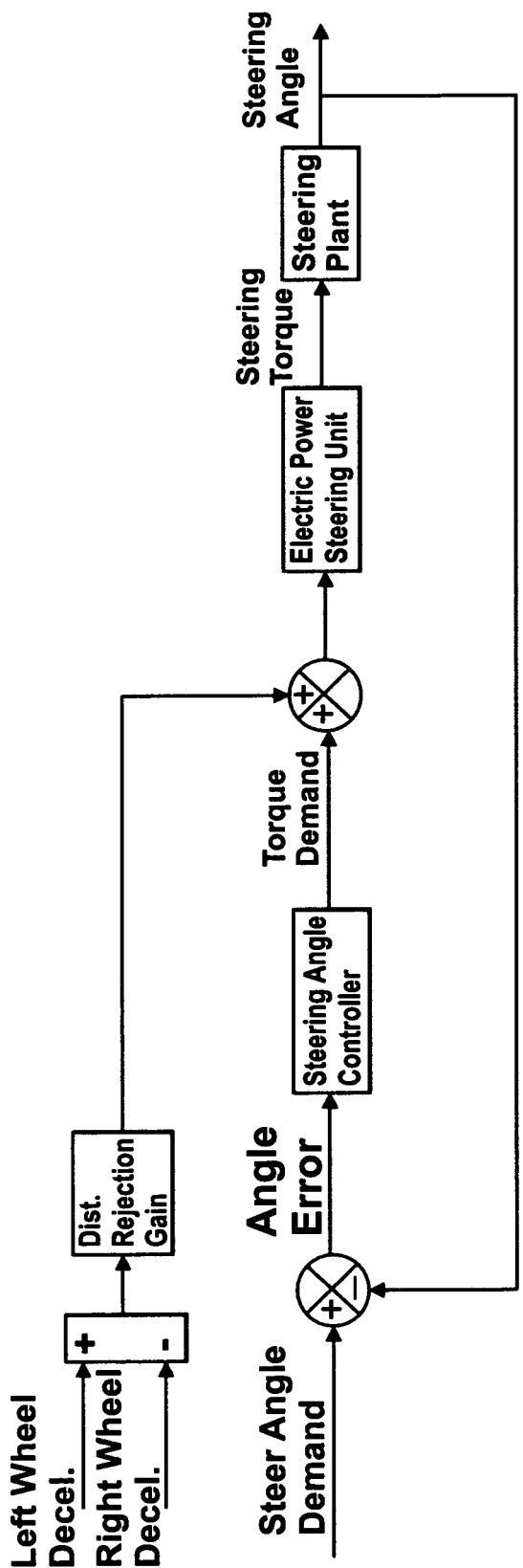
FIG. 6 is a more detailed schematic of a second arrangement for a control strategy for applying assistance to the steering to provide vehicle stability.

An alternative is shown in FIG. 6. This strategy is essentially the same except that the dist. Rejection signal is injected after the steering angle controller. This therefore derives a torque value rather than an angle value.

In both strategies, the yaw moment of the vehicle is derived from the measurement of wheel speed. The basis for this derivation is set out hereinafter, and relies on several assumptions. In this example the following assumptions are made:
1. The vehicle is braking and therefore drive torque, $T_d=0$
2. Lateral forces on the wheel are completely decoupled from the longitudinal dynamics.
3. The brake force $T_b$ is the same for left and right wheels at the start of the stop, i.e. before pressure is dumped.
4. The inertia, J, is the same for left and right wheels
5. The brake force distribution is 60%:40% front to rear.
6. Longitudinal weight transfer during braking is ignored.

As shown in FIG. 2, the yaw moment is derived using a controller that receives as its inputs measurements of the wheel accelerations (themselves obtained from measurements of the wheel speeds) and the overall vehicle acceleration.

The free body diagram of the wheel is shown in FIG. 7. Summing forces around the free body diagram gives:

$$J\ddot{\theta}=T_d-T_b-F_x r \quad (1)$$

Expanding for each wheel, setting $T_d=0$ and noticing that:

$$F_x=\mu F_N \quad (2)$$

gives $$J_L\ddot{\theta}_L=-T_{bL}-\mu_L F_{NL}r \quad (3)$$

$$J_R\ddot{\theta}_R=-T_{bR}-\mu_R F_{NR}r \quad (4)$$

Where the subscript L and R denote left and right wheels respectively. Assuming that the inertia of the wheels and the normal forces are the same and the brake torque is the same for left and right wheels at the start of the stop, then subtracting (3) from (4) gives:

$$\delta\mu = \mu_L - \mu_R = \frac{J(\ddot{\theta}_L - \ddot{\theta}_R)}{F_N r} \quad (5)$$

Note: This equation is only valid at the start of the stop, before ABS slip control commences. The value determined here is then held for the duration of the stop.

Next, Realising that for the entire vehicle:

$$F_X=ma_x; F_N=mg \quad (6)$$

And then substituting in (2) gives:

$$\mu = \frac{a_X}{g} \quad (7)$$

where $a_x$ is the vehicle deceleration. This indicates that the average friction level is equivalent to the vehicle acceleration if the acceleration is measured in "g".

Realising that this is an expression for $\mu$ is an indication of the average friction experienced by the vehicle, it is possible to determine an expression containing the friction at each wheel as:

$$\bar{\mu} = \frac{a_X}{g} = \frac{\mu_L + \mu_R}{2} \quad (8)$$

From the calculation of the mean and differential friction values, the individual friction values can be found from:

$$\mu_L = \bar{\mu} + \frac{\delta\mu}{2} \quad (9)$$

$$\mu_R = \bar{\mu} - \frac{\delta\mu}{2} \quad (10)$$

From the preceding, the total force on the vehicle can be found from:

$$F_{veh}=ma_x \quad (11)$$

and using the brake force distribution, the average force at each front and rear wheel is:

$$F_F=0.6F_{veh}/2 \quad (12)$$

$$F_R=0.4F_{veh}/2 \quad (13)$$

The total force on each wheel can then be determined. The total force on the front wheel for example, is found from:

$$F_{FL} = \begin{cases} F_F + \mu_L F_F : \mu_L > \mu_R \\ F_F - \mu_L F_F : \mu_L < \mu_R \end{cases}; F_{FR} = \begin{cases} F_F - \mu_R F_F : \mu_L > \mu_R \\ F_F + \mu_R F_F : \mu_L < \mu_R \end{cases} \quad (14)$$

Finally, the yaw moment is given by $$M_\Psi = a(F_{FL}-F_{FR})+b(F_{RL}-F_{RR}) \quad (15)$$

where a and b are the distance from the front and rear axle to the centre of gravity respectively.

It is to be noted that a further assumption is made here that the yaw moment generated by the rear axle may be zero or small enough to be ignored.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electric assisted steering control strategy for a steering system for a vehicle which is arranged to assist the driver in controlling the vehicle during a split mu braking operation, the control strategy comprising:
basing the assistance on at least one operational variable representing a corrective steer angle for the vehicle which is added to a main assistance torque via a driver feedback controller, and in which the strategy employs an estimate of yaw moment of the vehicle as the operational variable, the estimate of yaw moment of the vehicle being determined by processing the speed of wheels on opposite sides of the vehicle,
wherein the determination of the estimate of yaw moment of the vehicle includes the steps of:
(a) obtaining a first estimate of the speed of a front left wheel and a second estimate of the speed of a front right wheel of said vehicle;
(b) determining the difference between the first estimated speed and second estimated speed;
(c) multiplying the difference by a constant to give the difference in wheel speed for the front wheels; and
(d) dividing the result by the track width of the vehicle.

2. An electric assisted steering control strategy according to claim 1 wherein the first estimate of the speed of a front left wheel and a second estimate of the speed of a front right wheel are obtained in step (a) by measurement.

3. An electric assisted steering control strategy according to claim 1 which further includes multiplying the braking yaw moment by a gain to give a corrective steer angle.

4. An electric assisted steering control strategy according to claim 1 which includes measuring the wheel speeds upon initiation of a braking operation of the vehicle and disregarding any measured wheel speeds obtained after initial operation of an ABS system.

5. An electric assisted steering apparatus for a vehicle comprising:
   a steering mechanism which operatively connects a steering wheel to road wheels of a vehicle;
   a wheel speed sensor that determines the wheel speeds on opposite sides of the vehicle, the wheel speed sensor generating an output;
   a torque sensor which is adapted to produce an output signal indicative of the torque applied to a portion of the steering mechanism by a driver;
   a first signal processor which is adapted to determine an assistance torque as a function of the output signal of the torque sensor which is to be applied to the steering mechanism to assist the driver in turning the wheel;
   a second signal processor which determines a yaw moment of the vehicle based on at least one operational variable representing a corrective steer angle for the vehicle which is added to a main assistance torque; and
   in which the apparatus employs an estimate of yaw moment of the vehicle as the operational variable, the estimate of yaw moment of the vehicle being determined by processing the output of the wheel speed sensor,
   wherein the wheel speeds are measured upon initiation of a braking operation of the vehicle and any measured wheel speeds obtained after initial operation of an ABS system are disregarded.

6. An electric assisted steering apparatus according to claim 5 in which the wheel speed sensor includes a sensor associated with each wheel whose speed is to be determined.

7. An electric assisted steering apparatus according to claim 5 in which the second signal processor determines the yaw moment value using speed measurements obtained during an initial phase of braking and prior to the activation of any ABS system.

8. An electric assisted steering apparatus according to claim 5 in which the wheel speed signals correspond to the respective speeds of each of the two wheels attached to a front of a vehicle such as a four-wheel vehicle.

9. An electric assisted steering apparatus according to claim 5 which includes a memory in which is stored values indicative of at least one of the weight of the vehicle to which the steering is fitted; the track of the vehicle, and the geometry of the steering system.

10. An electric assisted steering apparatus according to claim 5 in which the wheel speed signals correspond to the respective speeds of each of the two wheels attached to a front axle of a multiple axle vehicle.

11. An electric assisted steering control strategy for a steering system for a vehicle which is arranged to assist the driver in controlling the vehicle during a split mu braking operation, the control strategy comprising:
    basing the assistance on at least one operational variable representing a corrective steer angle for the vehicle which is added to a main assistance torque via a driver feedback controller, and in which the strategy employs an estimate of yaw moment of the vehicle as the operational variable, the estimate of yaw moment of the vehicle being determined by processing the speed of wheels on opposite sides of the vehicle;
    wherein the wheel speeds are measured upon initiation of a braking operation of the vehicle and any measured wheel speeds obtained after initial operation of an ABS system are disregarded.

12. An electric assisted steering control strategy according to claim 11 wherein the determination of the estimate of yaw moment of the vehicle includes the steps of:
    (a) obtaining a first estimate of the speed of a front left wheel and a second estimate of the speed of a front right wheel of said vehicle;
    (b) determining the difference between the first estimated speed and second estimated speed;
    (c) multiplying the difference by a constant to give the difference in wheel speed for the front wheels; and
    (d) dividing the result by the track width of the vehicle.

13. An electric assisted steering control strategy according to claim 11 which further includes multiplying the braking yaw moment by a gain to give a corrective steer angle.

14. An electric assisted steering control strategy according to claim 11 wherein the first estimate of the speed of a front left wheel and a second estimate of the speed of a front right wheel are obtained in step (a) by measurement.

* * * * *